United States Patent
Musson

(10) Patent No.: US 7,146,340 B1
(45) Date of Patent: Dec. 5, 2006

(54) METHOD AND SYSTEMS FOR LICENSING ELECTRONIC DATA

(75) Inventor: Robert Alan Musson, Park City, UT (US)

(73) Assignee: Novell, Inc., Provo, UT (US)

( * ) Notice: Subject to any disclaimer, the term of this patent is extended or adjusted under 35 U.S.C. 154(b) by 1035 days.

(21) Appl. No.: 09/915,030

(22) Filed: Jul. 25, 2001
(Under 37 CFR 1.47)

(51) Int. Cl.
*G06Q 99/00* (2006.01)

(52) U.S. Cl. .......................... 705/57; 705/50; 709/226; 709/229; 713/201

(58) Field of Classification Search ................. 705/56, 705/57; 713/200, 201; 709/226
See application file for complete search history.

(56) References Cited

U.S. PATENT DOCUMENTS

| | | | |
|---|---|---|---|
| 4,937,863 A | 6/1990 | Robert et al. | |
| 5,138,712 A | 8/1992 | Corbin | |
| 5,375,206 A | 12/1994 | Hunter et al. | |
| 5,479,612 A * | 12/1995 | Kenton et al. | 726/5 |
| 5,579,479 A | 11/1996 | Plum | |
| 5,636,277 A | 6/1997 | Nagahama | |
| 5,771,347 A | 6/1998 | Grantz et al. | |
| 5,968,175 A * | 10/1999 | Morishita et al. | 713/200 |
| 6,049,789 A | 4/2000 | Frison et al. | |
| 6,173,446 B1 | 1/2001 | Khan et al. | |
| 6,189,146 B1 | 2/2001 | Misra et al. | |
| 6,233,567 B1 | 5/2001 | Cohen | |
| 2001/0034846 A1* | 10/2001 | Beery | 713/201 |
| 2003/0190043 A1* | 10/2003 | Sigbjornsen et al. | 380/201 |
| 2004/0225894 A1* | 11/2004 | Colvin | 713/200 |

\* cited by examiner

*Primary Examiner*—Firmin Backer
(74) *Attorney, Agent, or Firm*—King & Schickli, PLLC

(57) ABSTRACT

Methods and a system of licensing electronic data are provided. A method of ensuring proper licensing is provided, comprising the executable instructions of receiving a data file and removing at least a portion of the data file which prevents any use associated with the data file. Further, a license authenticating set of executable instructions are wrapped around the data file and executed to determine whether the data file is associated with a valid license. If the data file is associated with a valid license, the removed portion of the data file is restored making the data file available for use.

A method of authenticating a license set of executable instructions is provided, having executable instructions wherein the license set of executable instructions is received while a computing device housing the license set of executable instructions is in communication with one or more licensing computing devices. The license set of executable instructions is executed on the computing device to determine if a valid license exist, and the license set of executable instructions is prevented from further executing on the computing device if the valid license does not exist.

Furthermore, a system for validating data files is provided having a wrapping set of executable instructions operable to be executed prior to using a data file on a computing device. Moreover, a validation set of executable instructions is provided operable to permit the data file to be useable on the computing device if a valid license to use the data file exists on the computing device.

20 Claims, 4 Drawing Sheets

METHOD AND SYSTEMS FOR LICENSING ELECTRONIC DATA

FIELD OF THE INVENTION

The present invention relates to methods and systems for validating and customizing licenses associated with the distribution and use of electronic data.

BACKGROUND OF THE INVENTION

Ensuring that licensees of electronic data files have the proper licensing prior to using the data is of major concern to industries related to software, information, entertainment, and others. Providers of electronic data have become increasingly frustrated with their lack of ability to control and enforce licenses in the wake of the Internet and the World-Wide Web (WWW). Distribution of electronic data is omnipresent over the WWW, and data providers lack the technical ability to track and enforce their intellectual rights associated with this distribution.

Encryption technology has provided some relief by translating the electronic data into a format which is not useable until successfully decrypted. Yet, once the electronic data is decrypted it becomes vulnerable to being copied in its decrypted format. Correspondingly, encryption techniques have provided little relief to data providers, beyond the initial distribution of the electronic data to a valid licensee of that data. If the valid licensee abuses the license by making unauthorized copies of the electronic data and distributing those copies, then the data provider has little to no ability to prevent the prospective unauthorized use by a non licensed user, and further the data provider has little ability to detect the unauthorized distribution of its initial licensee.

Moreover, attempts have been made to require users to be connected to an external license server before use of the electronic data may proceed in a normal fashion. In this way, a user using an existing connection to the Internet, or using a direct connection to the license server, authenticates the use of the electronic data before each use of the data. In this instance, the data itself includes disabling logic or instructions which are not enabled until the data is properly authenticated by the license server. However, as is obvious by the above description, the data cannot be used unless a connection is made and maintained with the license server to authenticate the data.

Further, data providers may alter the data themselves, particularly when the data is a set of executable instructions (e.g., software executables). In this way, the executable instructions performs validation checks each time it is run against itself to ensure a valid license exists. For example, upon initial installation the executable instructions may create an encrypted flat file having information regarding the date of installation, the current date, the location of licensing files, and the like. On any subsequent execution of the software, this encrypted flat file is evaluated against any valid licensing logic to determine if the executable instructions may properly be executed.

This technique provides some security in enforcing valid data licensing, but it is not without some expense since subsequent upgrades, patches, and releases of the data require reinstallation of the data and this presents maintenance problems for the data provider, particularly if the data was modified in a Myriad of customized manners in order to accommodate a variety of user licenses. Furthermore, astute programmers are still capable of modifying the instructions while it is running in the operating system's memory by disabling those locations in the instructions where the licensing checks are occurring. The modified software may then be distributed and used by others with the licensing checks disabled.

As will be readily apparent, providing valid licenses and license checking with data are problematic issues for data providers. Accordingly, methods and systems which provide true licenses for data is needed, and these true licenses must be easily customizable to accommodate a variety of user needs without requiring labor intensive modifications to the data.

SUMMARY OF THE INVENTION

Accordingly, an aspect of the present invention is to provide methods and a systems for licensing electronic data. Electronic data may be provided such that a wrapper is provided and associated with additional data. The wrapper may be customized to enforce any license which a user has validly acquired from the data provider. The wrapper is distinctly separate from the data, although it may be delivered as part of the data. In this way, the data provides the core functionality or content which the data provider is making available, and data will not require modification if a different or subsequent wrapper is changed to reflect a different user license arrangement.

Further, the wrapping set of executable instructions is operable to remove a key portion of the data. Alternatively, a key portion of the data may reside in a hidden file which only the wrapping set of executable instructions has the logic to locate and reassemble as one complete data file. A key portion of the data may be defined as any data or file, which the data requires to execute or be of use to a licensee of the data provider.

By way of example only, consider a MICROSOFT WINDOWS' executable, which requires one or more Dynamic Linked Libraries (DLL) to run successfully, and without these DLLs the executable cannot run. In this example, the location of the necessary DLLs and the logic to properly load the DLLs may reside within a wrapping set of executable instructions, such that the executable (e.g., data of the data provider) will not run properly, until the wrapping set of executable instructions locates and loads the required DLLs. The DLLs are key portions of the data, although they may not be physically included within the data.

Alternatively, a key portion may actually be a portion of the data contained within the data itself, and the wrapping set of executable instructions has the proper logic to create a complete data file having the key portion inserted in the proper location within the data, such that the data may be used as intended by the data provider.

Further, the wrapping set of executable instructions is operable to validate any license associated with the data such that once the license has been properly authenticated, the data is restored to a functional state and the user is permitted to proceed with a use associated with the data. As one skilled in the art will readily appreciate, even existing data may be equipped with the wrapping sets of executable instructions of the present invention to enforce licensing requirements of a data provider against any electronic data.

Additional aspects, advantages and novel features of the invention will be set forth in the description that follows and, in part, will become apparent to those skilled in the art upon examining or practicing the invention. The aspects and advantages of the invention may be realized and obtained by means of the instrumentalities and combinations particularly pointed out in the appended claims. To achieve the foregoing and other aspects and in accordance with the purpose of the present invention, methods and systems for authenticating a license associated with electronic data are provided.

One aspect of the present invention provides a method of ensuring proper licensing, having executable instructions comprising receiving a data file and removing at least a portion of the data file, the removed portion prevents the data file from being used. A license set of executable instructions is wrapped around the data file, or otherwise associated therewith. The license set of executable instructions is executed to determine whether the data file is associated with a valid license. If a valid license, to use the data file exists, then the removed portion of the data file is restored, and the data file is available for use.

In another aspect of the present invention, a method of authenticating a license set of executable instructions is provided, having executable instructions, comprising receiving a license set of executable instructions while a computing device housing the license set of executable instructions is in communication with one or more licensing computing devices. The license set of executable instructions is then executed to determine if the license set of executable instructions has a valid license. The license set of executable instructions is permitted to be further executed on the computing device if the valid license exist, otherwise the license set of executable instructions is prevented from further execution on the computing device.

Another aspect of the present invention provides a system for validating data, comprising a wrapping set of executable instructions operable to be executed prior to using data on a computing device. Further, a validation set of executable instructions operable to permit the data to be useable on the computing device if a valid license to use the data exists on the computing device.

Still other aspects of the present invention will become apparent to those skilled in the art from the following description of an exemplary embodiment, which is by way of illustration, one of the exemplary modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
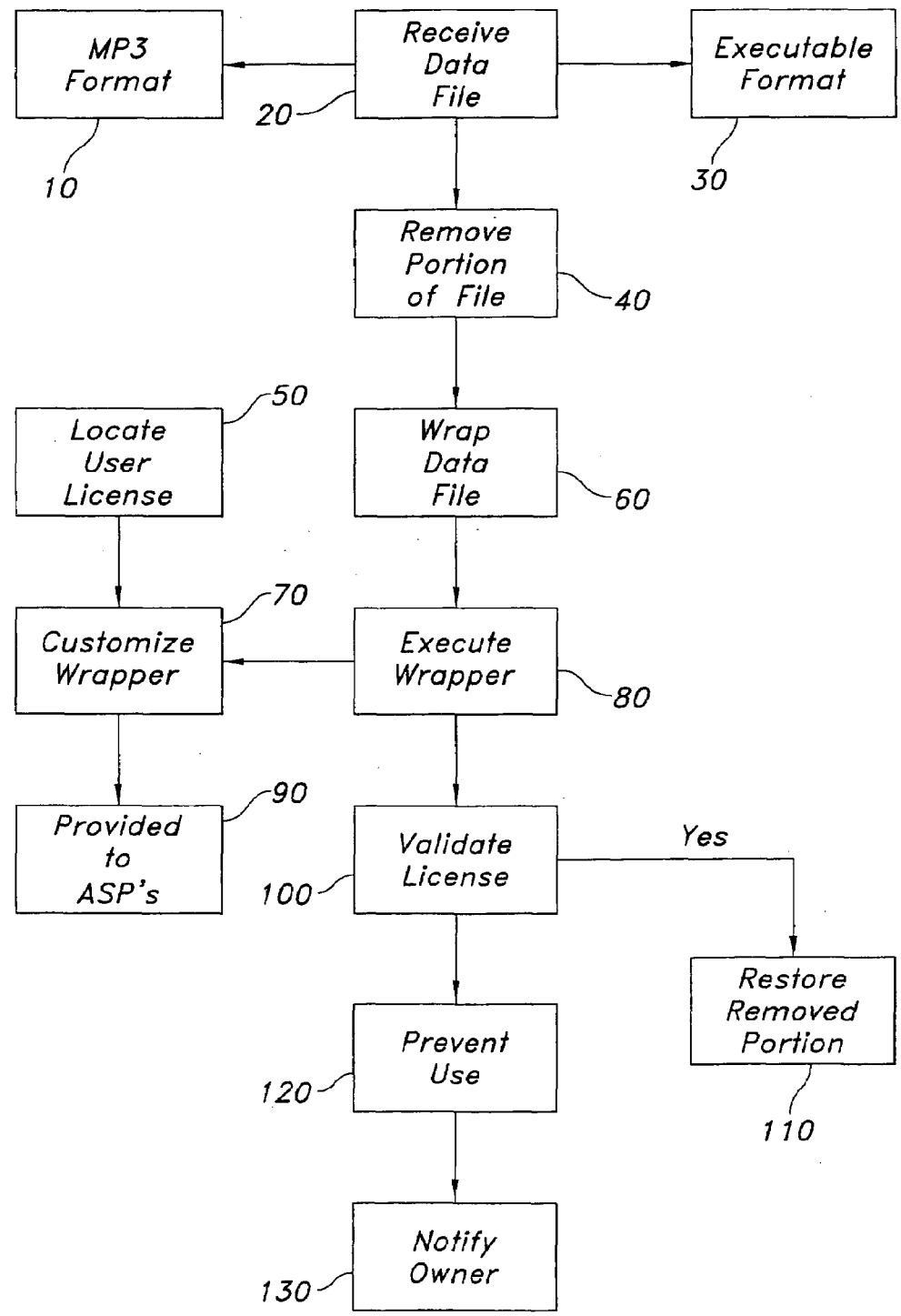
FIG. 1 depicts a flow diagram of a method of ensuring proper licensing.

The present invention provides methods and systems for authenticating a license associated with data. One embodiment of the present invention is implemented in NOVELL's NetWare operating system environment and implemented with the C or C++ programming language, or scripting languages such as PERL, Active Server Pages, Javascript, and the like.

Of course other operating systems and programming languages (now known or hereafter developed) may also readily employed. Moreover, as will be apparent to one skilled in the art the present invention may be used in combination with existing validation technologies, such as public-private key encryption technologies, and others.

Initially a data provider desires to provide a data file to one or more licensees. By way of example only, a data file is any electronic data file and may include data files which are themselves executable, such as a software application programs. Further, the data file may be a piece of audio such as a piece of music, or video such as a movie. Moreover, the data file may be data associated with print media, such that its contents are associated with material which is read. Also, the data file may be images associated with art, photographs, or drawings. As will be apparent to those skilled in the art, a data file may include any electronic data which the data provider wishes to control and license its distribution and use within an electronic media, such as the Internet, WWW, wireless technology, cable technology, plain old telephone lines (POTS), point of sale (POS) technology, interactive/web television, and the like.

The data file itself is distributed either as one unit of contiguous data or in separate units of data which when assembled create a single unit of contiguous data. Moreover, either separately or in connection with the distribution of the data file a wrapping set of executable instructions is distributed and associated with the data file. The wrapping set of executable instructions is data which is operable to be executable on a computing device. Furthermore, the wrapping set of executable instructions includes logic which is operable to remove key portions of the data file and/or restore key portions of the data file, or to otherwise appropriately assemble the data file to create a single unit of contiguous data.

Yet, the wrapping set of executable instructions is not necessary for the data file to be used by any computing device. In fact, once the wrapping set of executable instructions validate and assembles/restores the data file, the data file is made available for use on the computing device. For example, if the data file is an executable program then once the wrapping set of executable instructions validates that the data file is associated with a valid license, a complete data file is provided to the computing device and the data file is permitted to execute normally. In this way, should any subsequent releases, patches, or upgrades be needed to the data file, the wrapping set of executable instructions may remain unchanged. Or, alternatively should a user desire to upgrade a license to acquire additional feature/function of the data file, an upgrade to the wrapping set of executable instructions may occur without modification to the data file.

Further, as one skilled in the art will readily appreciate the present description provides a data provider with an option to create new licenses for existing data files without changing the data files. In addition, the licenses are easily customized by providing customized wrappers based on the licenses purchased by the licensee. Unauthorized use is prevented because the data files are not operable until the wrapper assembles or validates them appropriately.

The wrapping set of executable instructions is operable to enforce logic associated with a particular license, which the user of the data file has acquired from the data provider. Enforcement of the logic may be hard coded within the wrapper set of executable instructions, or it may be contained within an encrypted file, which the wrapping set of executable instructions reads. Moreover, a license file which is acquired during a connection to a license server may be downloaded to the licensed computing device and used by a licensee in a stand alone operation mode. In other words, the computing device need not acquire permission from a network license server to use a piece of software (e.g., data file), since the wrapping set of executable instructions may be used to validate the license which resides on the computing device. As one skilled in the art will readily appreciate, this would permit networked clients to operate in a stand alone mode during network outages, and yet still acquire the necessary licensing authentication typically required by many software program applications (e.g., data files).

A valid license may be ascertainable from a single authenticated file granting permission, or from a series of logical checks, which if successfully validated indicate that a valid license is present. Additionally, a license may be encrypted using public-private key technology, such that the wrapping set of executable instructions has the public key associated with decrypting the license and another set of license authentication set of executable instructions includes the private key associated with a particular license of a licensee. In this way, a valid license is only acquired through using the wrapping set of executable instructions which has the public key of the license.

As one skilled in the art will readily appreciate, a variety of configurations and checks may be made to validate whether a valid license is present on any particular computing device, all of which are intended to be included within the scope of the present invention when used in connection with a wrapping set of executable instructions which is operable to enable a previously disabled data file, once a valid license is detected.

FIG. 1 depicts a flow diagram of a method of ensuring proper licensing. Initially, a data file is received in step 20. As previously presented, the data file may be received in executable format as depicted in step 30, or it may be a file which is used by an executable program such as music data received in MP3 format as depicted in step 10. Once the data file is received a portion of the file, or any additional data required by the data file is removed in step 40.

Although as one skilled in the art will appreciate, data need not actually be removed from the data file, as all that would be needed would be to disable or disallow some additional data needed by the data file before it could be of use. For example, a DLL may intentionally not be loaded thereby preventing a data file associated with a MICROSOFT WINDOWS' set of executable instructions from running, until some other application loads the required DLL.

Once the data file is disabled in some way, the data file is wrapped with a wrapping set of executable instructions in step 60. Although as is readily apparent, the wrapping set of executable instructions need not be physically included within the same data file as the wrapping set of executable instructions, since wrappers may simply be a script language which executes an additional program first followed by the data file, if the additional program successfully completes. If the data file is not an executable, then after executing the wrapping set of executable instructions, the data file is provided in a useable form to the licensee.

The wrapping set of executable instructions is executed in step 80. The wrapping set of executable instructions may be customized in step 70 to accommodate a variety of licenses offered by a data provider. For example, a licensee may acquire a license which expires after a period of time, which is common when licensees acquire trial period licenses. At some later point in time, the licensee may wish to purchase a complete license, which may be provided to the licensee simply by updating the wrapping set of executable instructions to permit the use of the data file beyond the trial period. In this way and others, the wrapping set of executable instructions may be customized.

A valid user's license is located or determined to exist logically by the wrapping set of executable instructions in step 50. As previously presented, this license may be a single file which is validated using encryption/decryption technology, or it may be determined by proceeding with the execution of some logical comparisons by the wrapping set of executable instructions, such as and by way of example only, validating a computing device, a current date, a current user, and the like.

Further, customized wrappers may be provided for distribution to application service providers (ASP) in step 90 along with a single data file. In this way, the ASP can make a single data file available to all of its subscribers, with each subscriber having different rights and privileges associated with using the data file. These rights and privileges are determined by the customized wrapping set of executable instructions distributed or associated with each user of the ASP. As one skilled in the art will readily appreciate, this significantly increases the attractiveness of ASPs to data providers, since reduced functionality of a data file may be provided at a low cost to ASP users simply by providing a customized wrapper and without the need to create variant versions of the data file itself. Moreover, the ASP is alleviated from the burdensome administration of distributing algorithms since only a single version of a data file needs to be maintained for distribution.

If a valid license is determined to exist by the wrapping set of executable instructions in step 100, then the data file is restored to a condition which permits its execution. In other words, any needed information is provided or put in the appropriate location which makes the data file useable. If a valid license is not determined to exist, then in step 120 the data file remains in a non useable condition. Optionally, in step 130 the owner of the data file may be electronically notified of any unauthorized attempt to use the data file. This would allow data providers, to track down unauthorized copies of their data files and potentially the location of any unauthorized distribution.

Figure 2:
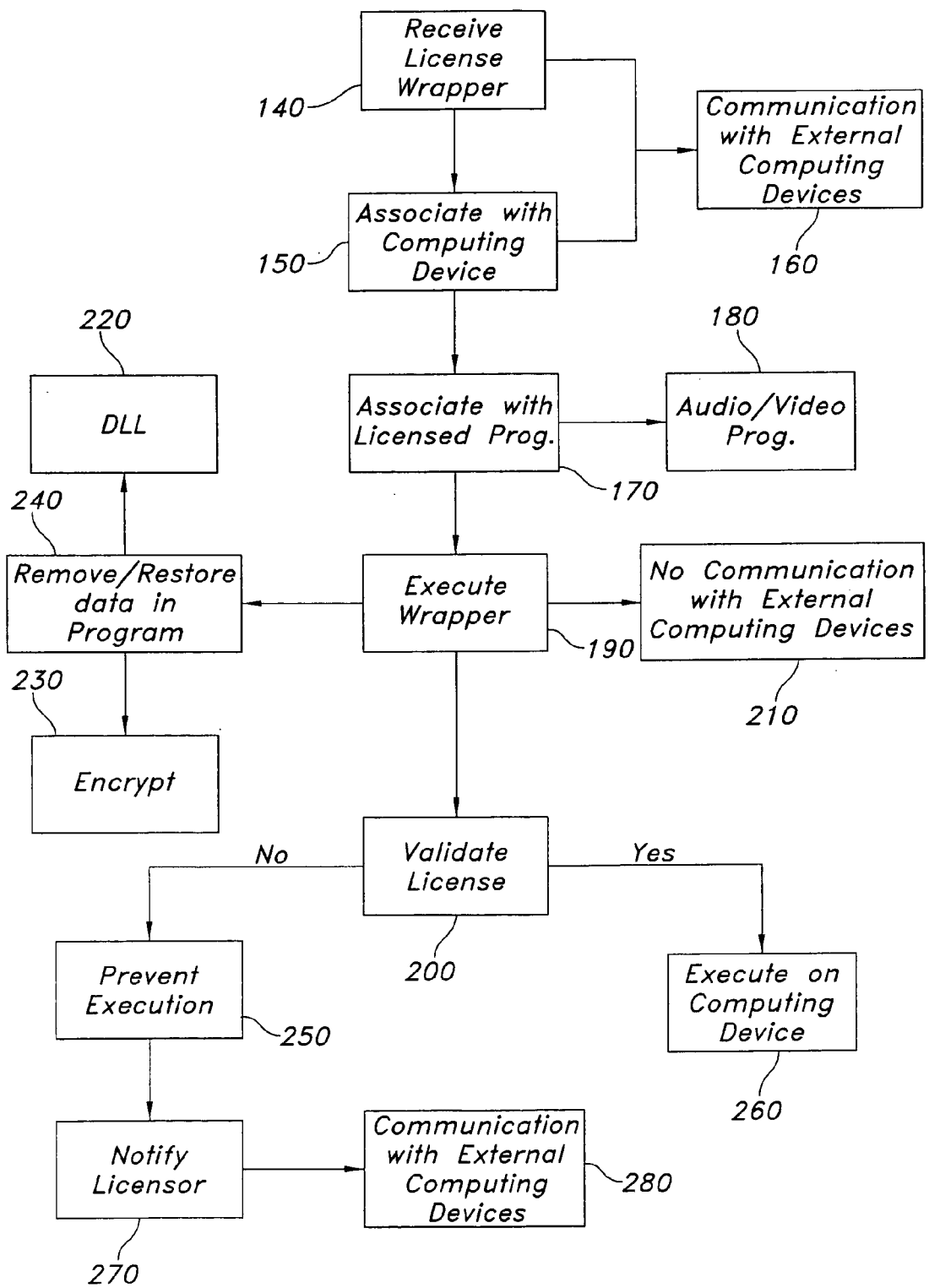
FIG. 2 depicts a flow diagram of a method of authenticating a licensed set of executable instructions.

FIG. 2 depicts a flow diagram of a method of authenticating a licensed set of executable instructions, A license set of executable instructions is received in step 140, the receipt of this set of executable instructions occurs while a computing device is in communication with an external computing device, which originally housed the license set of executable instructions in step 160. The license set of executable instructions is associated with the receiving computing device in step 150, and associated with a licensed data file in step 170.

The data file may be a program such as audio/video program depicted in step 180, or it may be a flat file which is used by another program such as audio data in MP3 format or video data in MPEG format. The license set of executable instructions is executed in step 190. Moreover, the execution of the license set of executable instructions may occur when the computing device is not connected to any other computing device as depicted in step 210. As one skilled in the art will readily appreciate, this permits a normal server licensed program to be executed by a user off-line in a stand alone mode. This would be extremely advantageous when network traffic is heavy due to increased traffic or when the network itself was unavailable to a user.

In step 240, key portions of the data file are removed or restored as required based upon whether the license set of executable instructions determines whether or not a valid license exist. For example, in step 220 a DLL may be removed and then restored once a valid license is determined to exist. Further, a single license file may be encrypted in step 230 with the license set of executable instructions operable to decrypt the license file to determine if a valid license is present to use the data file. As previously presented, a variety of operations or files may be used individually or in combination to determine whether a valid license is present (step 20).

If a valid license is not present, then in step 250 the data file is prevented from executing or being of any use to an alleged licensee. Further, a licensor may be electronically notified in step 270 of any failed attempt to access or use the data file. This notification may occur as soon as the computing device is once again in communication with other computing devices in step 280, such as and by way of example only, when the computing device reacquires an Internet connection, or reconnects to a network server.

If a valid license is detected then the data file is permitted to be executed in step 260, even if the computing device using the data file is not connected to other computing devices (e.g., the computing device is in a stand alone mode of operation). In this way, a licensee may access network programs or files while not connected to the network and the authentication of the license may still be ensured.

Figure 3:
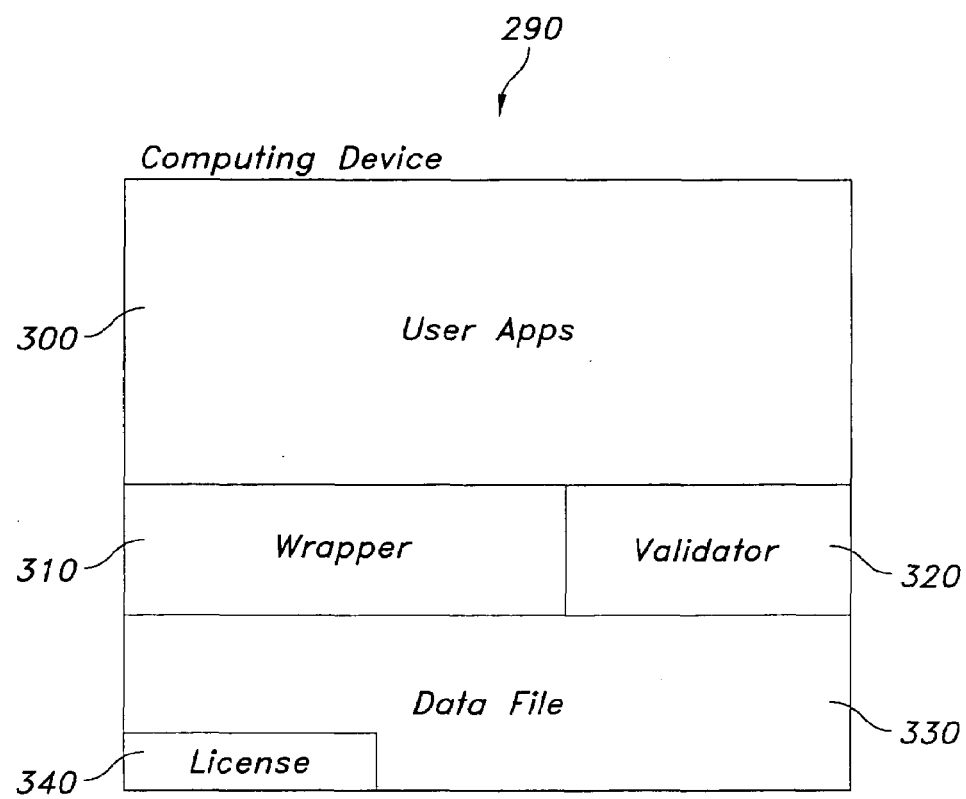
FIG. 3 depicts a system for validating data.

FIG. 3 depicts a system for validating data files. A computing device 290 includes one or more user applications 300, a wrapping set of executable instructions 310, and a validating set of executable instructions 320 operable to disable/enable a data file 330 based on the determination as to whether the computing device 290 or a user/application (not shown) has an appropriate license 340 to access the data file 330.

The data file 330 may be an executable file as previously presented with the validating set of executable 320 instructions operable to determine whether a valid license 340 is present on the computing device 290, even when the computing device 290 is in a stand alone mode of operation and not in communication with any external computing devices.

Further, the wrapping set of executable instructions 310 is operable to remove a portion of the data file 330 preventing its use on the computing device 290 when a valid license 340 is not authenticated on the computing device 290. Moreover, the wrapping set of executable instructions 310 is operable to restore removed portions of the data file 330 when a valid license 340 is detected on the computing device 290.

Figure 4:
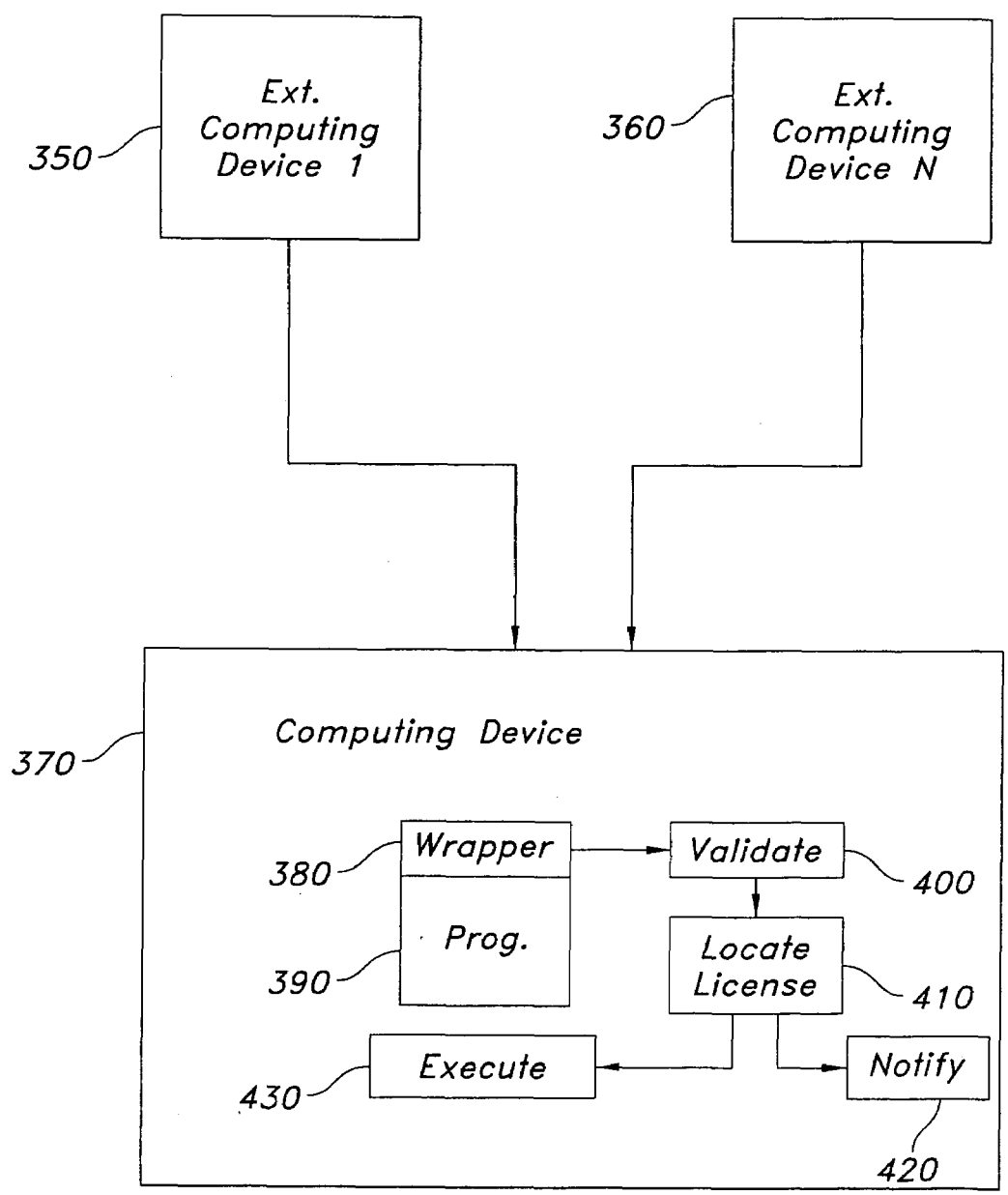
FIG. 4 depicts a schematic diagram of a system for validating data.

FIG. 4 depicts a schematic diagram of a system for validating data files. Initially a computing device 370 which is attempting to acquire rights to use a data file may be connected or be in communication with a first external computing device 350 and one or more additional external computing devices, such as computing device N 360. Upon the initial acquisition of a data file/program 390 from one of the external computing devices 350 or 360, a wrapping set of executable instructions 380 is provided with the data file/program 390 on computing device 370.

The wrapping set of executable instructions may further be associated with a validation set of executable instructions 400 wherein the validation set of executable instructions 400 locates or determines whether a valid license exists or is otherwise permissible 410. If the license is permissible, the data file/program 390 is allowed to execute or be used in 430, otherwise an owner associated with the data file/program 390 is notified electronically in 420. Validation and execution need not occur while the computing device 370 is in communication with any other external computing devices such as devices 350 and 360, since once the data file/program 390 is acquired from one or more of the external devices 350 or 360 the computing device is free to use the data file/program 390 and with each such use validation ensures that a proper authority exists to use the data file/program 390.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed is:

1. In a computing device, a method of ensuring proper licensing, comprising the steps of:
    receiving a data file at the computing device;
    removing at least a portion of the data file at the computing device preventing a use associated with the data file;
    wrapping a license authentication set of executable instructions around the data file at the computing device;
    executing the license authentication set of executable instructions at the computing device to determine whether the data file is associated with a valid license; and
    at the computing device, restoring the removed portion of the data file if the valid license exists thereby making the data file available for use.

2. The method of claim 1, further comprising:
    preventing the data file from use if the valid license is not authenticated.

3. The method of claim 2, further comprising:
    notifying an owner at other than the computing device location if the data file does not have the valid license.

4. The method of claim 1, wherein the data file is a set of executable instructions.

5. The method of claim 1, wherein the data file is an MP3 music file.

6. The method of claim 1, further comprising:
    customizing the license authentication set of executable instructions based on a user license.

7. The method of claim 1, further comprising:
    providing the license authentication set of executable instructions to one or more application service providers wherein the license authentication set of executable instructions is customized based on one or more levels of service of the application service providers.

8. A method of authenticating a licensed set of executable instructions, comprising the executable instructions of:
    receiving a license set of executable instructions while a computing device housing the license set of executable instructions is in communication with one or more licensing computing devices;
    executing the license set of executable instructions exclusively at the computing device to determine if the license set of executable instructions is associated with a valid license;
    permitting the license set of executable instructions to further execute on the computing device if the valid license exists; and
    preventing the license set of executable instructions from further executing on computing device if the valid license does not exist.

9. The method of claim 8, further comprising:
executing the license set of executable instructions while the computing device is not in communication with one or more of the licensing computing devices.

10. The method of claim 8, wherein the license set of executable instructions is associated with providing a least one of audio, image, and video data.

11. The method of claim 8, further comprising:
exclusively at the computing device, removing at least a portion of the license set of executable instructions prior to executing the license set of executable instructions.

12. The method of claim 11, further comprising:
exclusively at the computing device, restoring the removed portion of the license set of executable instructions only when the valid license exists.

13. The method of claim 11, wherein the portion removed is associated with a dynamic linked library necessary for execution of the license set of executable instructions.

14. The method of claim 11, wherein the removed portion is encrypted using public-private key technology.

15. The method of claim 14, wherein the private key or public key resides within the license set of executable instructions.

16. The method of claim 8, further comprising:
at other than the computing device location, notifying electronically a licensor of the license set of executable instructions if an attempt to execute the license set of executable instructions occurs at the computing device location without the valid license.

17. The method of claim 16, wherein the notification is made as soon as the computing device is capable of being in communication with the licensing computing devices.

18. A system for validating data files on a stand alone computing device, comprising:
a wrapping set of executable instructions operable to be executed on the computing device prior to using a data file on the computing device, the wrapping set of executable instructions operable to remove a portion of the data file preventing a use associated with the data file; and
a validation set of executable instructions on the computing device called by the wrapping set of executable instructions operable to permit the data file to be useable on the computing device if a valid license to use the data file exists on the computing device, usability of the data file including restoration of the removed portion of the data file.

19. The system of claim 18, wherein the data file is an executable set of instructions.

20. The system of claim 18, wherein the validation set of executable instructions operates while the computing device is not in communication with any external computing devices.

* * * * *